US009411627B2

(12) United States Patent
Chang et al.

(10) Patent No.: US 9,411,627 B2
(45) Date of Patent: Aug. 9, 2016

(54) ALLOCATING STORAGE FOR VIRTUAL MACHINE INSTANCES BASED ON INPUT/OUTPUT (I/O) USAGE RATE OF THE DISK EXTENTS STORED IN AN I/O PROFILE OF A PREVIOUS INCARNATION OF THE VIRTUAL MACHINE

(71) Applicant: International Business Machines Corporation, Armonk, NY (US)

(72) Inventors: Hao T. Chang, Cupertino, CA (US); Catherine C. Diep, Cupertino, CA (US); Harold H. Hall, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/335,496

(22) Filed: Jul. 18, 2014

(65) Prior Publication Data

US 2016/0019080 A1 Jan. 21, 2016

(51) Int. Cl.
*G06F 9/455* (2006.01)
*G06F 9/50* (2006.01)

(52) U.S. Cl.
CPC .......... *G06F 9/45558* (2013.01); *G06F 9/5011* (2013.01); *G06F 2009/4557* (2013.01); *G06F 2009/45562* (2013.01); *G06F 2009/45579* (2013.01)

(58) Field of Classification Search
CPC ............................................ G06F 2009/45562
USPC ............................................................ 718/1
See application file for complete search history.

(56) References Cited

U.S. PATENT DOCUMENTS

| 2012/0084414 | A1* | 4/2012 | Brock | G06F 9/5077 709/221 |
| 2013/0097601 | A1* | 4/2013 | Podvratnik | G06F 9/5027 718/1 |
| 2013/0254383 | A1 | 9/2013 | Wray | |

FOREIGN PATENT DOCUMENTS

FR EP 2506146 A2 * 10/2012 ............. G06F 9/485

OTHER PUBLICATIONS

Heeseung Jo et al., "SSD-HDD-Hybrid Virtual Disk in Consolidated Environments", 2010, p. 375-384.*
Mell et al., "The NIST Definition of Cloud Computing," Special Publication 800-145, Sep. 2011, pp. 1-7.

* cited by examiner

*Primary Examiner* — Wei Zhen
*Assistant Examiner* — Lanny Ung
(74) *Attorney, Agent, or Firm* — Robert A. Voigt, Jr.; Winstead, P.C.

(57) ABSTRACT

A method, system and computer program product for allocating storage for virtual machine instances. The input/output (I/O) usage of disk extents utilized by a virtual machine is saved in an I/O profile of the virtual machine. In response to deallocating the virtual machine, the I/O usage of the disk extents is extracted from its I/O profile and saved in a data structure. Upon starting a new instance of the virtual machine, new disk extents are allocated to the new virtual machine instance. The I/O usage of the disk extents for the previous incarnation of the virtual machine is applied to the disk extents allocated to the new virtual machine instance. The newly allocated disk extents can now be placed in either a solid-state drive device or a hard disk drive device based on this I/O history without requiring a twenty-four hour long cycle.

20 Claims, 6 Drawing Sheets

ALLOCATING STORAGE FOR VIRTUAL MACHINE INSTANCES BASED ON INPUT/OUTPUT (I/O) USAGE RATE OF THE DISK EXTENTS STORED IN AN I/O PROFILE OF A PREVIOUS INCARNATION OF THE VIRTUAL MACHINE

TECHNICAL FIELD

The present invention relates generally to cloud computing, and more particularly to allocating disk extents for virtual machine instances between hard disk drive and solid-state drive resources based on the input/output (I/O) usage rate of the disk extents stored in an I/O profile of a previous incarnation of the virtual machine.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

Currently, the cloud computing nodes of the cloud computing environment may be connected to a storage system that includes a combination of Solid-State Drive (SSD) devices and Hard Disk Drive (HDD) devices. SSD devices have a lower access time and latency than HDD drives but are more expensive. As a result, the controller of the storage system, commonly referred to as the storage controller, stores the most frequently accessed data in the SSD devices. In particular, the controller places disk extents (contiguous sets of disk blocks) utilized by the virtual machines in either the HDD or SSD device based on how frequently the disk extents are utilized. The disk extents that are more frequently utilized are placed in the SSD device.

The controller allocates the disk extents to the virtual machines as the virtual machines are allocated and deallocated. Unfortunately, the controller may often take twenty-four hours or longer to appropriately place the disk extents to either the HDD or SSD device since the decision is based upon a historical trend of the input/output operation of the disk extents utilized by the virtual machine. By requiring a twenty-four hour or longer cycle to appropriately place the disk extents to the appropriate device (HDD or SSD device) in the storage system, resources are being inefficiently utilized.

BRIEF SUMMARY

In one embodiment of the present invention, a method for allocating storage for virtual machine instances comprises monitoring input/output usage of disk extents utilized by a virtual machine. The method further comprises saving the input/output usage of the disk extents in a profile of the virtual machine. The method additionally comprises extracting the input/output usage of the disk extents from the profile of the virtual machine in response to deallocating the virtual machine. Furthermore, the method comprises saving the input/output usage of the disk extents in a data structure. Additionally, the method comprises allocating new disk extents to a new instance of the virtual machine in response to starting the new instance of the virtual machine. In addition, the method comprises obtaining the input/output usage of the disk extents from the data structure. The method further comprises applying, by a processor, the obtained input/output usage of the disk extents to the new instance of the virtual machine so that the obtained input/output usage of the disk extents applies to the allocated disk extents for the new instance of the virtual machine. The method additionally comprises placing the allocated disk extents for the new instance of the virtual machine to either a hard disk drive device or a solid-state drive device based on the obtained input/output usage of the disk extents.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
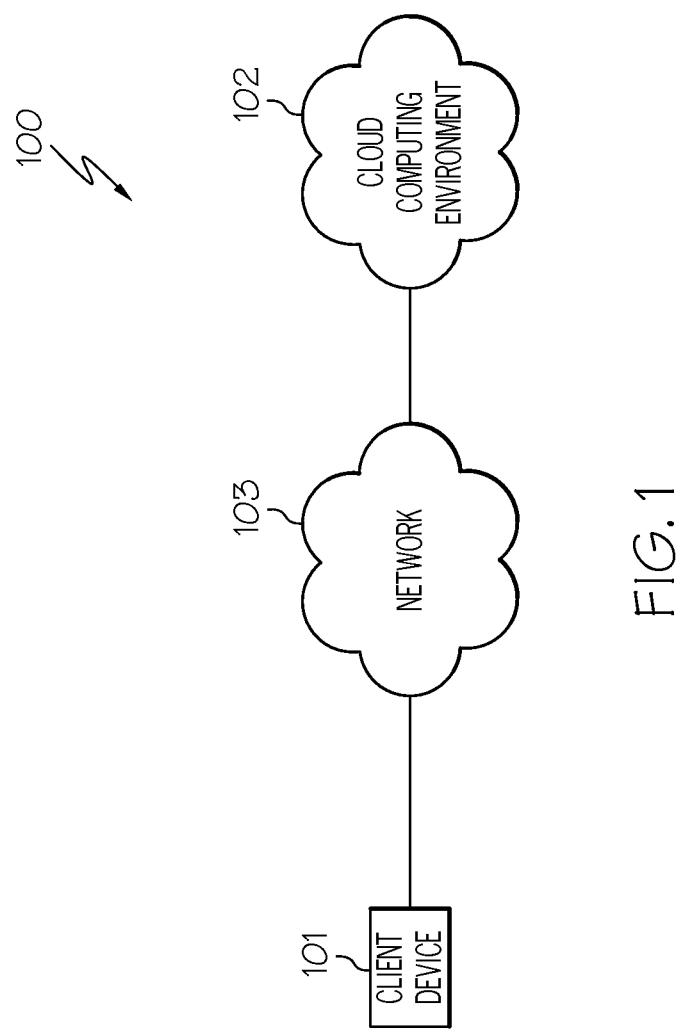
FIG. 1 illustrates a network system configured in accordance with an embodiment of the present invention.

The present invention comprises a method, system and computer program product for allocating storage for virtual machine instances. In one embodiment, the input/output (I/O) usage of disk extents utilized by a virtual machine is monitored. The I/O usage of the disk extents is saved in an I/O profile of the virtual machine. In response to deallocating the virtual machine, the I/O usage of the disk extents is extracted from its I/O profile. The extracted I/O usage of the disk extents is saved in a data structure along with an identifier of the virtual machine. Upon starting a new instance of the virtual machine, new disk extents are allocated to the new virtual machine instance. The I/O usage of the disk extents for the previous incarnation of the virtual machine is obtained from the data structure using the identifier of the previous incarnation of the virtual machine. The obtained I/O usage history is applied to the new instance of the virtual machine so that the I/O usage history applies to the disk extents allocated to the new virtual machine instance. Since it is likely that the I/O patterns for the new virtual machine instance will be similar to the I/O patterns of the previous incarnation of the virtual machine, the I/O history of the disk extents of the previous incarnation of the virtual machine can be applied to the newly allocated disk extents. Since the I/O history of the newly allocated disk extents are known within a reasonable error, the newly allocated disk extents can be placed in either a solid-state drive device or a hard disk drive device based on this I/O history without requiring a twenty-four hour long cycle.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
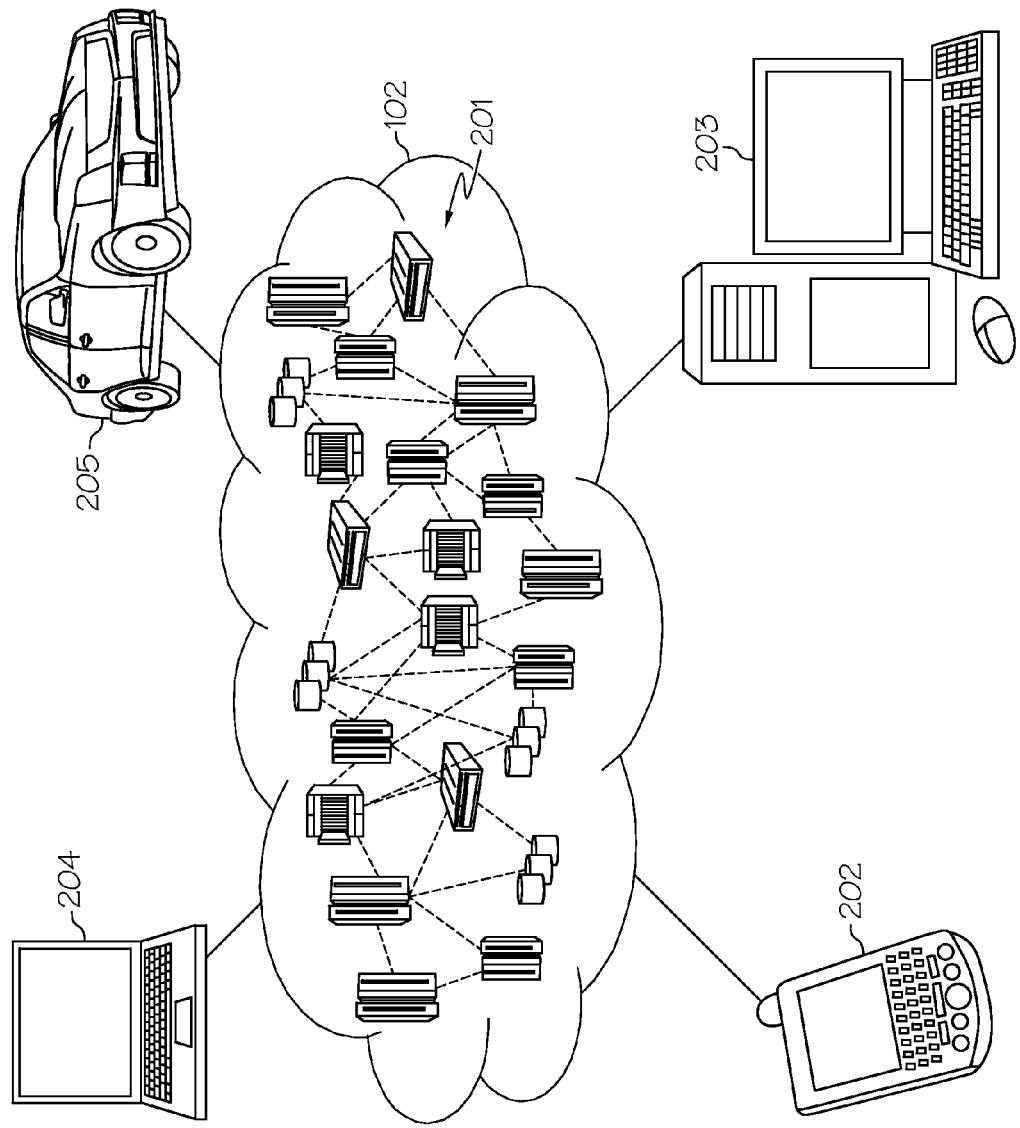
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
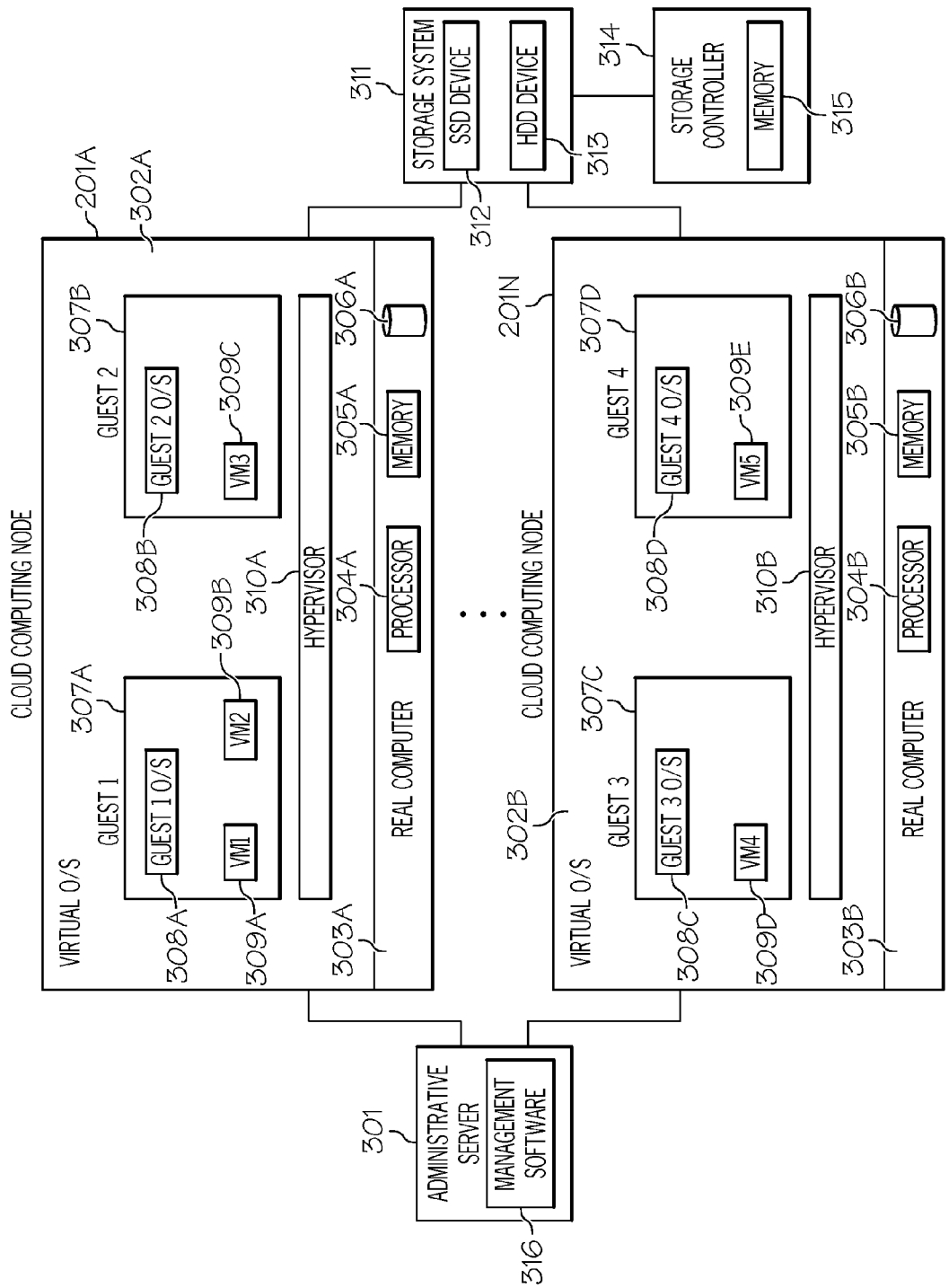
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N, where N is a positive integer number, in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3" and "Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

In one embodiment, cloud computing nodes 201 are connected to a storage system 311 which includes various drive devices, such as Solid-State Drive (SSD) devices 312 and Hard Disk Drive (HDD) devices 313. The storing of data in storage system 311 is controlled by a storage controller 314. In one embodiment, storage controller 314 includes memory 315 for storing a data structure for storing the input/output usage history of disk extents as well as the identifier of the associated virtual machine 309 as discussed further below. Furthermore, in one embodiment, memory 315 stores a data structure for storing the input/output profiles of virtual machines 309 as discussed further below.

Referring again to FIG. 3, in some embodiments, administrative server 301 supports a module, referred to herein as the management software 316, that can be used to manage all the hardware components of cloud computing nodes 201, monitor system utilization, intelligently deploy images of data and optimize the operations of cloud computing environment 102. Furthermore, management software 316 can be used to allocate disk extents for virtual machine instances 309 between hard disk drive device 313 and solid-state drive device 312 without requiring twenty-four hour long cycles as discussed further below in connection with FIGS. 5-6. A description of the hardware configuration of administrative server 301 is provided further below in connection with FIG. 4.

Figure 4:
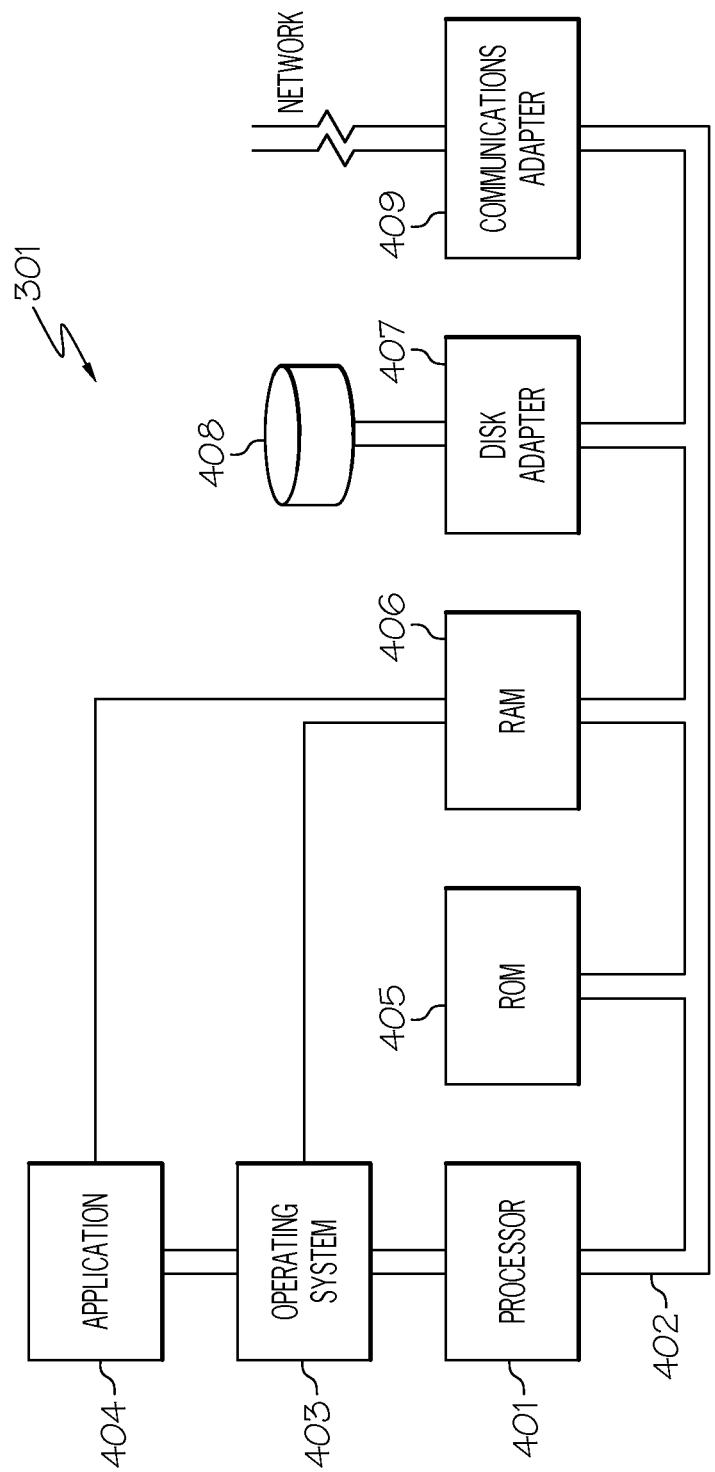
FIG. 4 illustrates a hardware configuration of an administrative server configured in accordance with an embodiment of the present invention.

Referring now to FIG. 4, FIG. 4 illustrates a hardware configuration of administrative server 301 (FIG. 3) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., management software 316 of FIG. 3) for allocating disk extents for virtual machine instances 309 (FIG. 3) between hard disk drive device 313 (FIG. 3) and solid-state drive device 312 (FIG. 3) without requiring twenty-four hour long cycles as discussed further below in association with FIGS. 5-6.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for allocating disk extents for virtual machine instances 309 between hard disk drive device 313 and solid-state drive device 312 without requiring twenty-four hour long cycles, as discussed further below in association with FIGS. 5-6, may reside in disk unit 408 or in application 404.

Administrative server 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, the cloud computing nodes of the cloud computing environment may be connected to a storage system that includes a combination of Solid-State Drive (SSD) devices and Hard Disk Drive (HDD) devices. SSD devices have a lower access time and latency than HDD drives but are more expensive. As a result, the controller of the storage system, commonly referred to as the storage controller, stores the most frequently accessed data in the SSD devices. In particular, the controller places disk extents (contiguous sets of disk blocks) utilized by the virtual machines in either the HDD or SSD device based on how frequently the disk extents are utilized. The disk extents that are more frequently utilized are placed in the SSD device. The controller allocates the disk extents to the virtual machines as the virtual machines are allocated and deallocated. Unfortunately, the controller may often take twenty-four hours or longer to appropriately place the disk extents to either the HDD or SSD device since the decision is based upon a historical trend of the input/output operation of the disk extents utilized by the virtual machine. By requiring a twenty-four hour or longer cycle to appropriately place the disk extents to the appropriate device (HDD or SSD device) in the storage system, resources are being inefficiently utilized.

Figure 5:
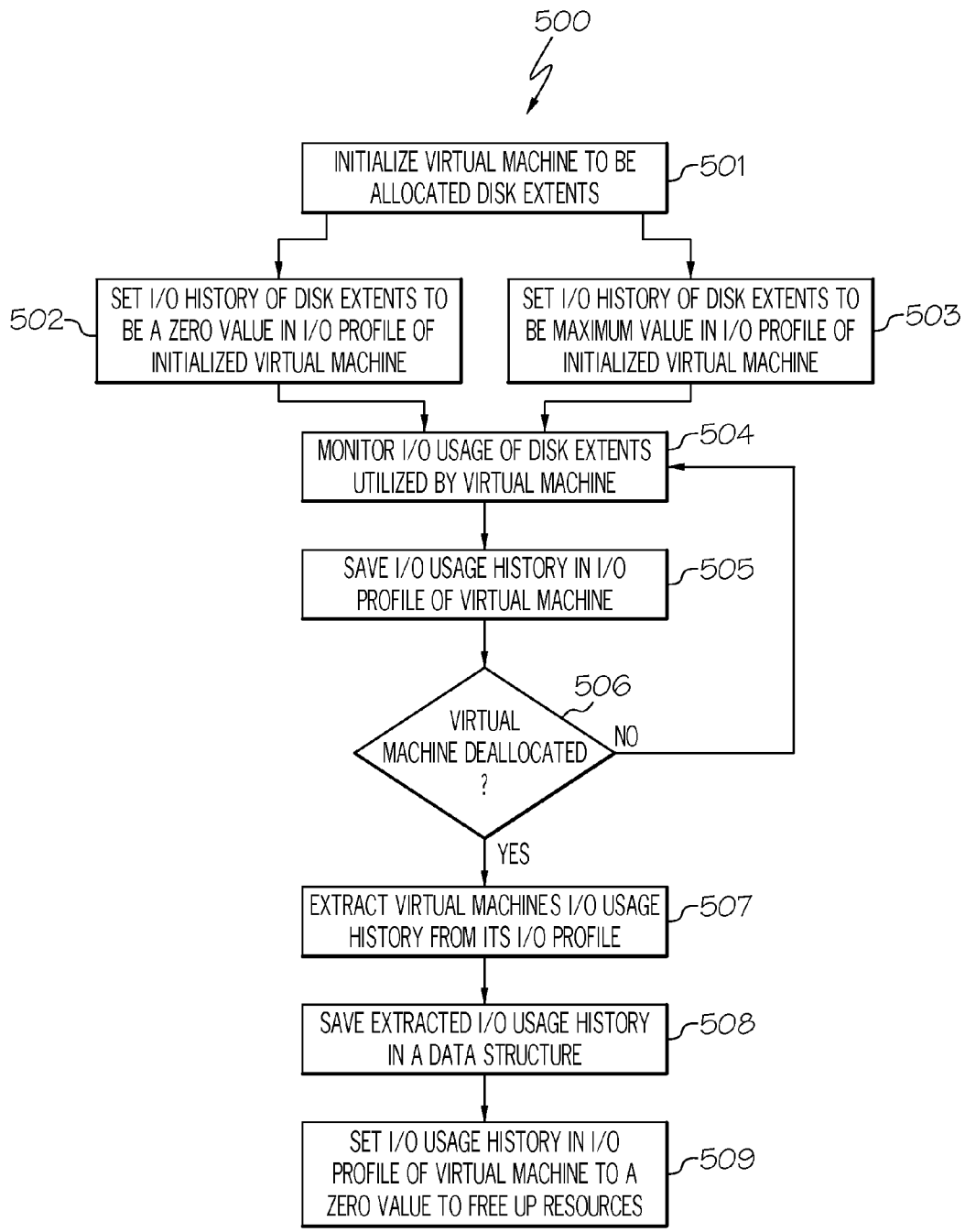
FIG. 5 is a flowchart of a method for utilizing an input/output profile for storing the input/output usage rate of the disk extents in accordance with an embodiment of the present invention.
Figure 6:
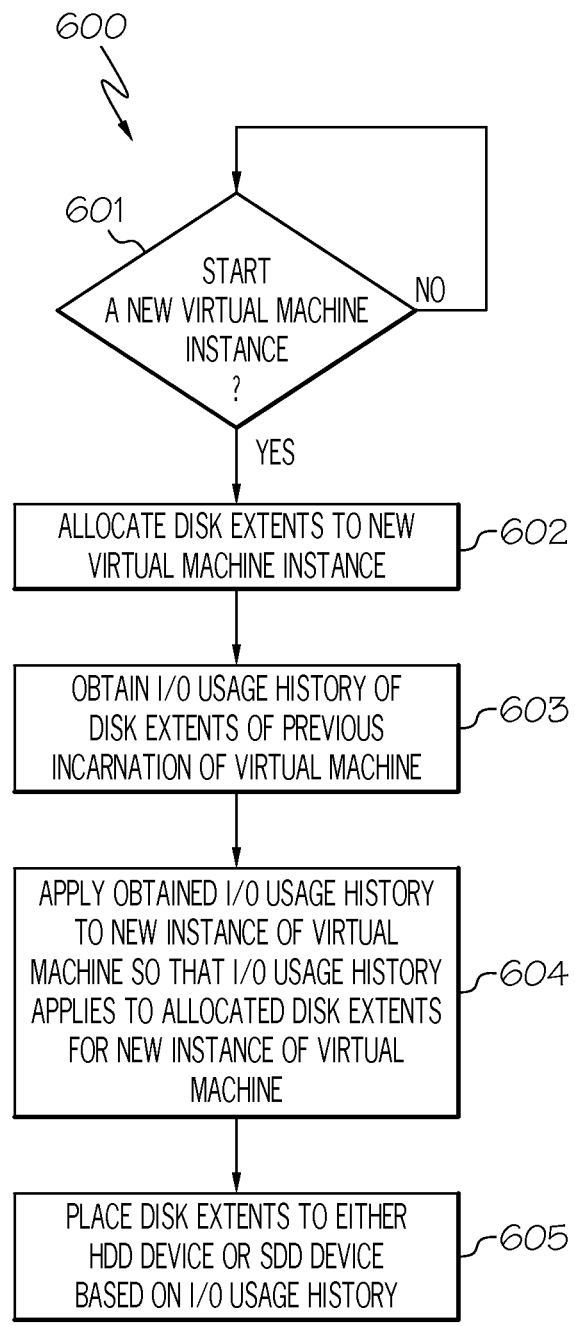
FIG. 6 is a flowchart of a method for placing the disk extents allocated to a virtual machine in either the HDD or SSD device without requiring twenty-four hour long cycles based on the input/output (I/O) usage rate of the disk extents stored in an I/O profile of a previous incarnation of the virtual machine in accordance with an embodiment of the present invention.

The principles of the present invention provide a means for appropriately placing the disk extents allocated to a virtual machine in either the HDD or SSD device without requiring twenty-four hour long cycles based on the input/output (I/O) usage rate of the disk extents stored in an I/O profile of a previous incarnation of the virtual machine as discussed below in connection with FIGS. 5-6. FIG. 5 is a flowchart of a method for utilizing an input/output profile for storing the input/output usage rate of the disk extents. FIG. 6 is a flowchart of a method for placing the disk extents allocated to a virtual machine in either the HDD or SSD device without requiring twenty-four hour long cycles based on the input/output (I/O) usage rate of the disk extents stored in an I/O profile of a previous incarnation of the virtual machine.

As stated above, FIG. 5 is a flowchart of a method 500 for utilizing an input/output profile for storing the input/output usage rate of the disk extents in accordance with an embodiment of the present invention.

Referring now to FIG. 5, in conjunction with FIGS. 1-4, in step 501, administrative server 301 initializes a virtual machine 309 (e.g., virtual machine 309A) to be allocated "disk extents." Disk extents, as used herein, refers to a contiguous set of disk blocks.

In response to allocating disk extents to virtual machine 309, administrative server 301 sets the input/output (I/O) usage history of the disk extents to be a zero value in an I/O profile of the initialized virtual machine 309 (e.g., virtual machine 309A). The I/O usage pattern of the disk extents refers to the input/output operations utilized by the virtual machine of the disk extents. The I/O profile refers to a data structure for storing the I/O usage pattern of the disk extents and other information about the disk extents, such as an identifier of the disk extents, the starting block address and the number of contiguous blocks. In one embodiment, the I/O profiles of virtual machines 309 are stored in a data structure in memory 315 of storage controller 314.

The I/O usage pattern of the disk extents are used to determine whether the disk extents should be moved to SSD device 312 or to HDD device 313. In the past, when a virtual machine is allocated disk space and started up, the disk extents it uses may previously have had a history of activity, such as input/output operations with those disk extents. Such a history is not valid for a newly initialized virtual machine 309. As a result, in one embodiment, the disk extents allocated to the newly initialized virtual machine 309 should not be associated with any I/O usage history which can be accomplished by setting the I/O usage history of the disk extents to be a zero value in the I/O profile of the initialized virtual machine 309. When the I/O usage history is set to a zero value, then the disk extents allocated to the initialized virtual machine 309 are placed in HDD device 313. That is, virtual machine 309 utilizes hard disk drive device 313 for a period of time in response to setting the I/O usage history of the disk extents to a zero value.

Alternatively, in response to allocating disk extents to virtual machine 309, in step 503, administrative server 301 sets the input/output (I/O) usage history of the disk extents to be a maximum value in the I/O profile of the initialized virtual machine 309 (e.g., virtual machine 309A). By setting the I/O usage history of the disk extents to be a maximum value, the disk extents allocated to the initialized virtual machine 309 are placed in SSD device 312 since the "maximum value" indicates a history of significant I/O operations for the disk extents. That is, virtual machine 309 utilizes solid-state device 312 for a period of time in response to setting the I/O usage history of the disk extents to a maximum value. Such an embodiment may be utilized to speed up the time spent in formatting and copying newly acquired disk extents.

Upon setting the I/O history of the disk extents as discussed in either step 502 or step 503, in step 504, administrative server 301 monitors the I/O usage of the disk extents utilized by virtual machine 309.

In step 505, administrative server 301 saves the I/O usage history in the I/O profile of virtual machine 309. In one embodiment, administrative server 301 saves the I/O usage history in the I/O profile of virtual machine 309 periodically. In one embodiment, the I/O profiles of virtual machines 309 are stored in memory 315 of storage controller 314.

In step 506, a determination is made by administrative server 301 as to whether virtual machine 309 (e.g., virtual machine 309A) has been deallocated. If virtual machine 309 has not been deallocated, then administrative server 301 continues to monitor the I/O usage of the disk extents utilized by virtual machine 309 in step 504.

If, however, virtual machine 309 (e.g., virtual machine 309A) has been deallocated, then, in step 507, administrative server 301 extracts virtual machine's 309 I/O usage history of the disk extents from its I/O profile.

In step 508, administrative server 301 saves the extracted I/O usage history of the disk extents in a data structure, such as a data structure stored in memory 315 of storage controller 314. In one embodiment, an identifier of the virtual machine 309 (e.g., virtual machine 309A) that utilized those disk extents is saved in the data structure in connection with the extracted I/O usage history. In this manner, the I/O history of the disk extents is associated with that virtual machine 309 (e.g., virtual machine 309A) and will be able to be retrieved when a new instance of that virtual machine 309 (e.g., virtual machine 309A) is started.

In step 509, administrative server 301 sets the I/O usage history of the disk extents in the virtual machine's 309 I/O profile to a zero value to free up system resources. In the past, the I/O usage history of the disk extents was not set to a zero value thereby causing storage controller 314 to continue to hold onto the disk extents, such as the disk extents in SSD drive 312, for a period of time (e.g., next forty-eight hours). By setting the I/O usage history of the disk extents to a zero value, such resources can now be freed to be utilized by other virtual machines 309.

Once an I/O usage history of the disk extents is stored, such information can be utilized when a new instance of virtual machine 309 is initialized as discussed below in connection with FIG. 6.

FIG. 6 is a flowchart of a method 600 for placing the disk extents allocated to a virtual machine 309 (FIG. 3) in either the HDD or SSD device 313, 312 (FIG. 3), respectively, without requiring twenty-four hour long cycles based on the input/output (I/O) usage rate of the disk extents stored in an I/O profile of a previous incarnation of virtual machine 309 in accordance with an embodiment of the present invention.

Referring to FIG. 6, in conjunction with FIGS. 1-5, in step 601, a determination is made by administrative server 301 as to whether a new instance of virtual machine 309 (e.g., virtual machine 309A) is to be started. If a new instance of virtual machine 309 is not be started, then administrative server 301 continues to determine if a new instance of virtual machine 309 is to be started in step 601.

If, however, a new instance of virtual machine 309 (e.g., virtual machine 309A) is started, then, in step 602, administrative server 301 allocates disk extents to the new virtual machine instance 309.

In step 603, administrative server 301 obtains the I/O usage history of the disk extents of the previous incarnation of virtual machine 309 (e.g., virtual machine 309A) that was stored in a data structure in step 508. In one embodiment, an identifier of the previous incarnation of virtual machine 309 is used to identify the correct I/O usage history of the disk extents stored in the data structure.

In step 604, administrative server 301 applies the obtained I/O usage history to the new instance of virtual machine 309 (e.g., virtual machine 309A) so that the I/O usage history applies to the allocated disk extents for the new instance of virtual machine 309 (e.g., virtual machine 309A). Since it is likely that the I/O patterns of the new instance of virtual machine 309 (e.g., virtual machine 309A) will be similar to the I/O patterns of the previous incarnation of virtual machine 309 (e.g., virtual machine 309A), the I/O history of the disk extents of the previous incarnation of virtual machine 309 can be applied to the newly allocated disk extents. Since the I/O history of the newly allocated disk extents are known within a reasonable error, administrative server 301 can instruct storage controller 314 to place the newly allocated disk extents to either SSD device 312 or HDD device 313 based on this I/O history without requiring a twenty-four hour long cycle.

In step 605, administrative server 301 places the newly allocated disk extents to either SSD device 312 or HDD device 313 based on the I/O usage history. For example, if the I/O usage history indicates a history of significant I/O operations for the disk extents, then those disk extents will be placed in SSD device 312.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allocating storage for virtual machine instances, the method comprising:
   monitoring input/output usage of disk extents utilized by a virtual machine;
   saving said input/output usage of said disk extents in a profile of said virtual machine;
   extracting said input/output usage of said disk extents from said profile of said virtual machine in response to deallocating said virtual machine;
   saving said extracted input/output usage of said disk extents in a data structure;
   allocating new disk extents to a new instance of said virtual machine in response to starting said new instance of said virtual machine;
   obtaining said input/output usage of said disk extents from said data structure;
   applying, by a processor, said obtained input/output usage of said disk extents to said new instance of said virtual machine so that said obtained input/output usage of said disk extents applies to said allocated disk extents for said new instance of said virtual machine; and
   placing said allocated disk extents for said new instance of said virtual machine to either a hard disk drive device or a solid-state drive device based on said obtained input/output usage of said disk extents.

2. The method as recited in claim 1 further comprising:
   initializing said virtual machine to be allocated said disk extents; and
   setting a history of said disk extents to be a zero value in said profile of said initialized virtual machine.

3. The method as recited in claim 2, wherein said virtual machine utilizes said hard disk drive device for a period of time in response to setting said history of said disk extents to said zero value.

4. The method as recited in claim 1 further comprising:
   initializing said virtual machine to be allocated said disk extents; and
   setting a history of said disk extents to be a maximum value in said profile of said initialized virtual machine.

5. The method as recited in claim 4, wherein said virtual machine utilizes said solid-state drive device for a period of time in response to setting said history of said disk extents to said maximum value.

6. The method as recited in claim 1 further comprising:
   setting a history of said input/output usage of said disk extents in said profile of said virtual machine to be a zero value in response to deallocating said virtual machine.

7. The method as recited in claim 1, wherein said input/output usage of said disk extents is saved in said profile of said virtual machine periodically.

8. A computer program product for allocating storage for virtual machine instances, the computer program product comprising a computer readable storage medium having program code embodied therewith, the program code comprising the programming instructions for:
   monitoring input/output usage of disk extents utilized by a virtual machine;
   saving said input/output usage of said disk extents in a profile of said virtual machine;
   extracting said input/output usage of said disk extents from said profile of said virtual machine in response to deallocating said virtual machine;
   saving said extracted input/output usage of said disk extents in a data structure;
   allocating new disk extents to a new instance of said virtual machine in response to starting said new instance of said virtual machine;
   obtaining said input/output usage of said disk extents from said data structure;
   applying said obtained input/output usage of said disk extents to said new instance of said virtual machine so that said obtained input/output usage of said disk extents applies to said allocated disk extents for said new instance of said virtual machine; and
   placing said allocated disk extents for said new instance of said virtual machine to either a hard disk drive device or a solid-state drive device based on said obtained input/output usage of said disk extents.

9. The computer program product as recited in claim 8, wherein the program code further comprises the programming instructions for:
   initializing said virtual machine to be allocated said disk extents; and
   setting a history of said disk extents to be a zero value in said profile of said initialized virtual machine.

10. The computer program product as recited in claim 9, wherein said virtual machine utilizes said hard disk drive device for a period of time in response to setting said history of said disk extents to said zero value.

11. The computer program product as recited in claim 8, wherein the program code further comprises the programming instructions for:
    initializing said virtual machine to be allocated said disk extents; and
    setting a history of said disk extents to be a maximum value in said profile of said initialized virtual machine.

12. The computer program product as recited in claim 11, wherein said virtual machine utilizes said solid-state drive device for a period of time in response to setting said history of said disk extents to said maximum value.

13. The computer program product as recited in claim 8, wherein the program code further comprises the programming instructions for:
    setting a history of said input/output usage of said disk extents in said profile of said virtual machine to be a zero value in response to deallocating said virtual machine.

14. The computer program product as recited in claim 8, wherein said input/output usage of said disk extents is saved in said profile of said virtual machine periodically.

15. A system, comprising:
    a memory unit for storing a computer program for allocating storage for virtual machine instances; and
    a processor coupled to the memory unit, wherein the processor is configured to execute the program instructions of the computer program comprising:
       monitoring input/output usage of disk extents utilized by a virtual machine;
       saving said input/output usage of said disk extents in a profile of said virtual machine;
       extracting said input/output usage of said disk extents from said profile of said virtual machine in response to deallocating said virtual machine;
       saving said extracted input/output usage of said disk extents in a data structure;
       allocating new disk extents to a new instance of said virtual machine in response to starting said new instance of said virtual machine;
       obtaining said input/output usage of said disk extents from said data structure;

applying said obtained input/output usage of said disk extents to said new instance of said virtual machine so that said obtained input/output usage of said disk extents applies to said allocated disk extents for said new instance of said virtual machine; and placing said allocated disk extents for said new instance of said virtual machine to either a hard disk drive device or a solid-state drive device based on said obtained input/output usage of said disk extents.

16. The system as recited in claim 15, wherein the program instructions of the computer program further comprises:

initializing said virtual machine to be allocated said disk extents; and setting a history of said disk extents to be a zero value in said profile of said initialized virtual machine.

17. The system as recited in claim 16, wherein said virtual machine utilizes said hard disk drive device for a period of time in response to setting said history of said disk extents to said zero value.

18. The system as recited in claim 15, wherein the program instructions of the computer program further comprises:

initializing said virtual machine to be allocated said disk extents; and setting a history of said disk extents to be a maximum value in said profile of said initialized virtual machine.

19. The system as recited in claim 18, wherein said virtual machine utilizes said solid-state drive device for a period of time in response to setting said history of said disk extents to said maximum value.

20. The system as recited in claim 15, wherein the program instructions of the computer program further comprises:

setting a history of said input/output usage of said disk extents in said profile of said virtual machine to be a zero value in response to deallocating said virtual machine.

* * * * *